Feb. 7, 1967   C. J. YOUNG   3,302,519
OPTICAL ILLUMINATING SYSTEM
Filed Jan. 7, 1965   2 Sheets-Sheet 1
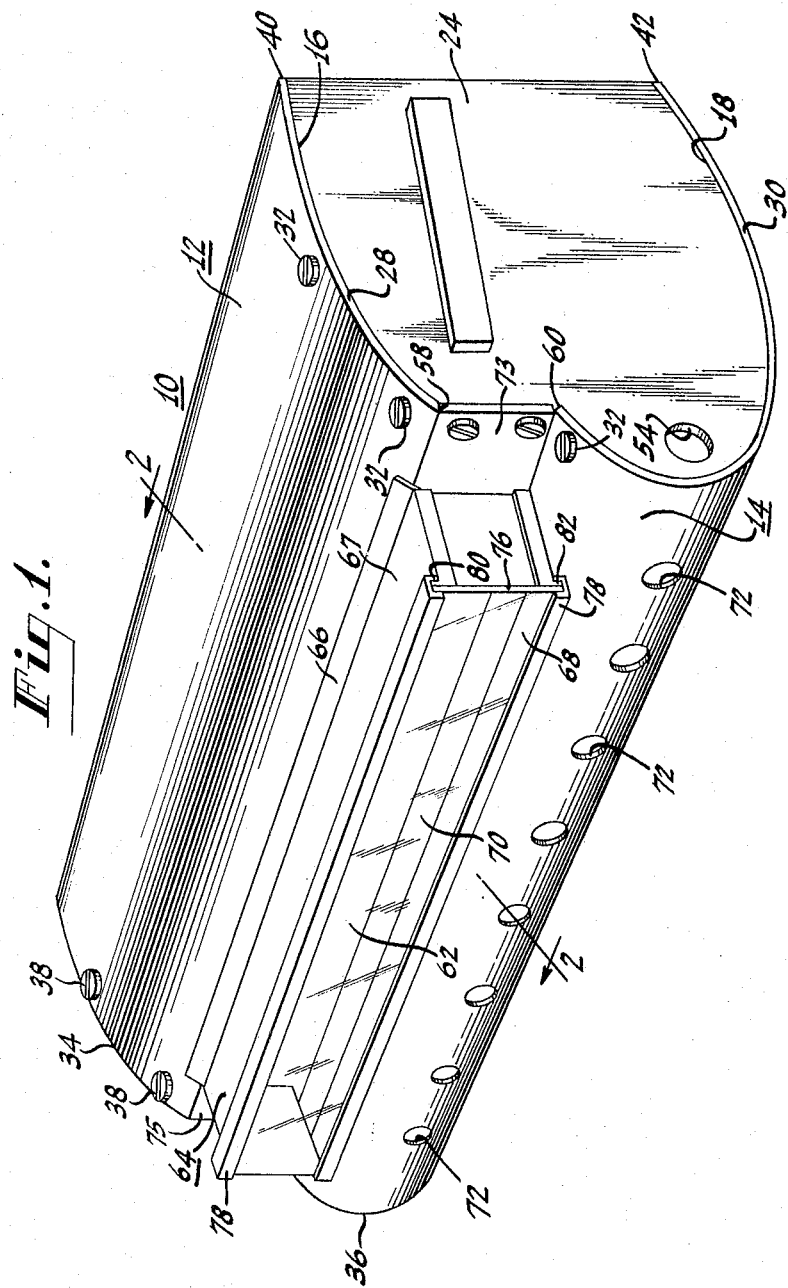
INVENTOR.
CHARLES J. YOUNG
BY
Attorney

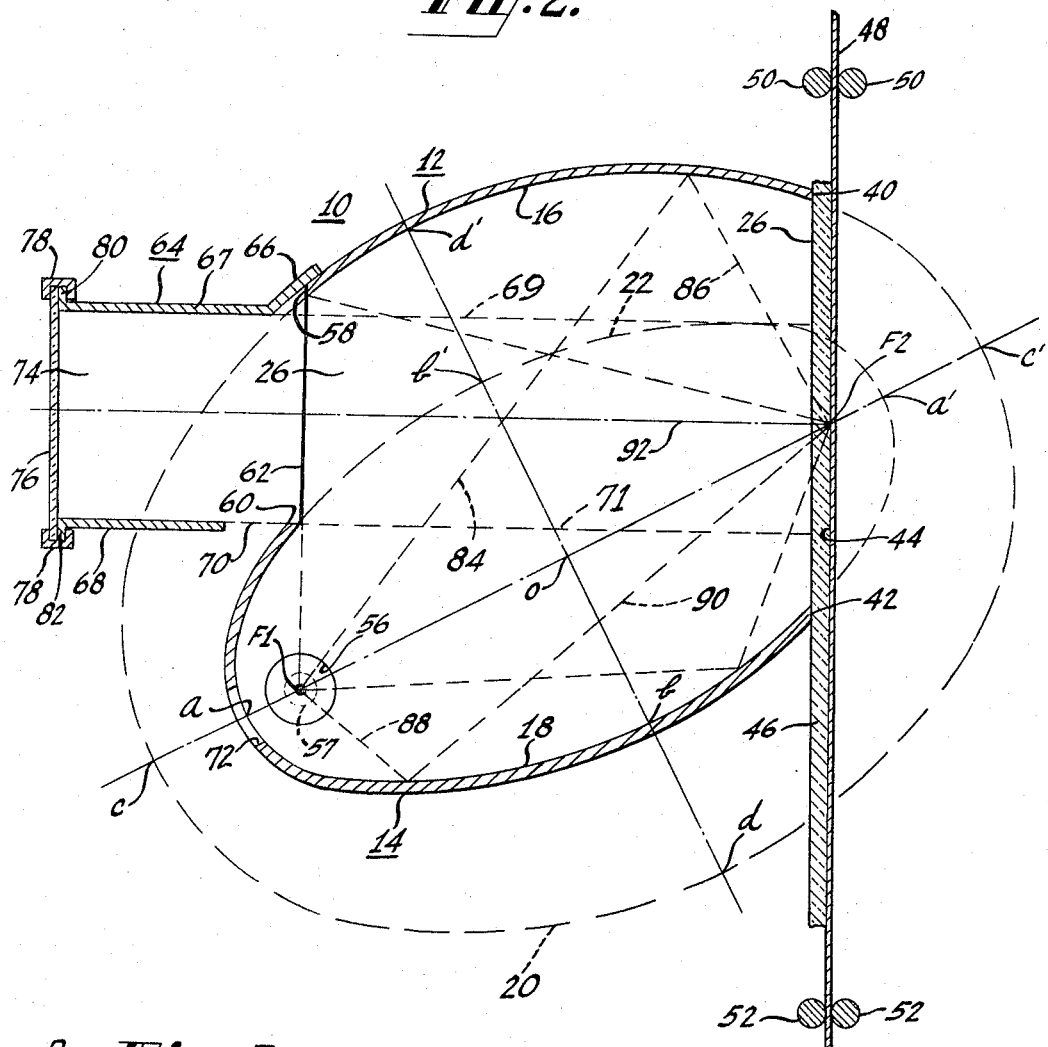

United States Patent Office 3,302,519
Patented Feb. 7, 1967

3,302,519
OPTICAL ILLUMINATING SYSTEM
Charles J. Young, Princeton, N.J., assignor to Radio Corporation of America, a corporation of Delaware
Filed Jan. 7, 1965, Ser. No. 423,994
8 Claims. (Cl. 88—24)

This invention relates generally to optical illuminating systems, and more particularly to a novel, elliptical, light reflector housing for illuminating an object on one side of the housing and for passing reflected light from the object through an opening in the opposite side of the housing. The novel optical system and apparatus of the present invention are particularly useful for illuminating and reflecting an image of material to be copied in automatic, compact, photographic and/or electrophotographic copying machines, and the like.

In making reproductions of sheet material, such as business letters, for example, by means of certain automatic copying machines, it is usually desirable to illuminate consecutive elongated areas of the sheet material successively as the sheet moves through the machine. For certain, prior art, copying machines, it has been proposed to illuminate the sheet material by two point-like light sources appropriately disposed adjacent to opposite lateral edges of the sheet material, respectively. For other, prior art, copying machines, it has been proposed to employ an elongated light source with a single elliptical reflector to provide a ribbon, or line, of light on the object. While these prior art, optical illuminating arrangements are satisfactory in relatively large copying machines, they leave something to be desired in smaller, more compact machines because these arrangements usually produce unwanted stray light which is not only wasted but which must be masked by space-consuming structures to protect light-sensitive copying materials in the machines.

It is an object of the present invention to provide an improved optical illuminating system for illuminating an elongated area of an object with the maximum amount of available light, without obstructing the light reflected from the object along a path substantially normal to the object.

It is another object of the present invention to provide an improved, compact elliptical reflector housing for illuminating an object plane, with a ribbon of light, on one side of the housing and for passing uninterrupted reflected light from the object through an opening in the opposite side of the housing.

A further object of the present invention is to provide an improved optical illuminating system employing a pair of elliptical cylindrical reflectors of different ellipticity in a highly efficient arrangement for producing a ribbon of light and substantially eliminating unwanted stray light.

Still a further object of the present invention is to provide an improved, elliptical, light reflector housing for an optical system of the type described that is relatively simple in structure, economical to produce, and highly efficient for providing a uniform ribbon of light on, and for accepting reflected light from, an object plane in a relatively compact copying apparatus.

Briefly stated, a preferred embodiment of the improved optical illuminating system of the present invention is incorporated in a novel, light reflector apparatus that includes a pair of concave elliptical reflectors of different ellipticity. The reflectors comprise portions of the walls that define hollow right elliptical cylinders. The reflectors are disposed with their concave walls facing each other and sharing the same pair of line foci. An elongated lamp is positioned at one of the line foci to illuminate an object disposed in an object plane at, or near, the other of the line foci. The object plane is substantially closer to the other of the line foci than to the one of the line foci. The rear edges of the reflectors are spaced from each other and so disposed with respect to each other that they define an opening through which only light from the object can pass, direct light from the light source being excluded from the opening.

Other novel features of the present invention, both as to its organization and method of operation, as well as additional objects and advantages thereof, will be described in greater detail by reference to the accompanying drawings, in which similar reference characters designate similar parts throughout, and in which:

FIG. 1 is a perspective view of light reflector apparatus comprising the optical illuminating system of the present invention;

FIG. 2 is a cross-sectional view of the reflector apparatus illustrated in FIG. 1, taken along the line 2—2, showing the reflector apparatus disposed to illuminate an object, and also showing schematically, by straight broken lines, the paths of light through the optical illuminating system, portions of right elliptical cylinders used to describe elliptical reflectors being shown by curved broken lines, and FIG. 3 is a schematic diagram showing how reflected light from the object is projected onto an image plane.

Referring, now, particularly to FIG. 1 of the drawings, there is shown a novel light reflector housing 10 embodying the improved optical illuminating system of the present invention. The light housing 10 comprises a pair of elliptical reflectors 12 and 14 of different ellipticity, that is, the concave surfaces, or walls, 16 and 18 of the reflectors 12 and 14, respectively, are portions of different hollow right elliptical cylinders, as illustrated schematically in FIG. 2. By the term "ellipticity" is meant the degree of divergence of an ellipse (or a right elliptical cylinder) from a circle (or a right circular cylinder).

Referring, now, to FIG. 2, the concave wall 16 of the reflector 12 comprises a portion of the wall of a hollow right elliptical cylinder 20, the latter being shown in a broken curved line. The right elliptical cylinder 20 has two imaginary parallel line foci F1 and F2. Since the cross-sectional representation of the housing 10, in FIG. 2, is taken along a plane perpendicular to the parallel line foci F1 and F2, the foci F1 and F2 appear as points in FIG. 2.

The concave wall 18 of the reflector 14 is a portion of the wall of a hollow right elliptical cylinder 22, also illustrated by a broken curved line in FIG. 2. The reflectors 12 and 14 are disposed with their concave walls 16 and 18, respectively, facing each other, as shown in FIG. 2. The right elliptical cylinder 22 has the same pair of parallel line foci F1 and F2 as the right elliptical cylinder 20, but the elliptical cylinder 22 is of greater ellipticity and thus smaller than the elliptical cylinder 20. Because of their coincident foci, the reflectors 12 and 14 are disposed with respect to each other so that the intersections of their major and minor axes are super-imposed on each other, as at the point O. The major axis $aa'$ of the elliptical cylinder 22 is disposed on the major axis $cc'$ of the elliptical cylinder 20, and the minor axis $bb'$ of the elliptical cylinder 22 is disposed on the minor axis $dd'$ of the elliptical cylinder 20.

The reflectors 12 and 14 may be made from sheet metal such as stainless steel, aluminum, or iron, for example. The concave walls 16 and 18 may be highly polished or surfaced with a light colored coating, such as aluminum, to give them a high light-reflecting characteristic.

The reflectors 12 and 14 are fixed with respect to each other, as shown in FIG. 2, by any suitable means, such as by a pair of side walls 24, (FIG. 1) and 26 (FIG. 2) fixed to opposite ends, respectively, of the reflectors 12 and 14. The wall 24 is fixed to the ends 28 and 30 of the reflectors 12 and 14 by any suitable means, such as screws 32. The wall 26 is fixed to the ends 34 and 36 of the reflectors 12 and 14, respectively, by any suitable means, such as screws 38. The inner surface of the walls 24 and 26 should also be reflective surfaces so as to avoid any unnecessary absorption of light which would lower the overall efficiency of the apparatus. In compact apparatus, the walls 24 and 26 may actually be supporting structures of the machine in which the optical illuminating system of the present invention is incorporated.

The front edges 40 and 42 of the reflectors 12 and 14, respectively, are spaced apart and parallel to each other. A glass plate 46 is disposed against the edges 40 and 42, by any suitable means, closing the opening between these edges and the end walls 24 and 26. The outer surface of the glass plate 46 defines an object plane 44, which is disposed substantially at the focus F2.

In this specification and the appended claims, it is to be understood that the descriptive terms "front," "rear," "top," and "bottom," for example, are merely relative and are used for clarity of description and are not to be interpreted in a limiting sense. For example, the housing 10 may be disposed in any attitude in a copying machine where a part described herein as being on top is actually on the bottom, without substantially affecting the efficiency and/or operation of the invention.

An object, such as sheet material 48 which may be a letter to be copied, is disposed with the side thereof which has the information to be copied against the glass plate 46 in the object plane 44. Two pairs of drive rollers 50 and 52, driven by any suitable means (not shown), are provided to engage opposite ends of the sheet material 48 and move the sheet material 48 at a desired rate of speed along the object plane 44.

Means are provided to dispose an elongated source of illumination along the line focus F1 for illuminating the object in the object plane 44. To this end, the walls 24 and 26 are formed with holes 54 and 56, respectively, for supporting a line light source 57, such as a General Electric "Quartzline" incandescent lamp of the iodine type. The sockets and electrical connections for illuminating the lamp, as well as the lamp itself, are not shown in detail since they are of conventional type, it being understood that the line focus F1 and the dashed circle 57, in FIG. 2, represents a line source of light, such as from a long thin filament.

In order to obtain maximum illumination of the sheet material 48 from a given intensity light source 57, the object plane (and hence the outer surface of the glass plate 46) should be disposed to contain the line focus F2. Where the concentration of light along the line focus F2 is more intense than necessary, the object plane 44 may be slightly spaced from the line focus F2. The latter condition may, in fact, be preferred to prevent overheating of the object sheet 48 or of the glass plate 46.

The rear edges 58 and 60 of the reflectors 12 and 14, respectively, are spaced apart from each other, are parallel to each other, and define an opening 62. Only light reflected from the object plane 44 can pass through the opening 62; direct light from the source of light 57 is excluded from passing through the opening 62 by virtue of their relative positions.

An elongated tubular member 64 of rectangular cross-section is fixed over the opening 62 by any suitable means. For example, a flap 66 extending from the top wall 67 of the tubular member 64 may be welded to the convex surface of the reflector 12 adjacent to the latter's rear edge 58. Thus, light reflected from the elongated portion of the sheet 48, between the imaginary parallel planes 69 and 71 extending from the upper and lower walls 67 and 68, respectively, passes through the tubular member 64.

The lower wall 68 of the tubular member 64, as shown in FIGS. 1 and 2, is spaced from the reflector 14 to provide an opening 70 for injecting air, by means of suitable conduits (not shown), into the housing 10 for cooling purposes. The reflector 14 is formed with a plurality of openings 72 at spaced-apart points having the shortest radii of curvature on the inner concave wall 18, that is, directly behind the light source 57 for permitting heated air to escape. With this air-cooling arrangement, no useful light is lost because reflected light directly behind the lamp 57 would be blocked by the lamp anyway.

An opening 74 of the tubular member 64 remote from the opening 62 may be closed by a relatively thin transparent sheet of material 76, such as mylar, for example, to confine the cooling air injected into the housing 10 and to prevent the air from escaping through the tubular member 64. The material 76 may be held against the opening 74 by any suitable means, as by channel clamps 78 disposed between the material 76 and flanges 80 and 82 on the ends of the upper and lower walls 67 and 68.

The length of the elongated opening 62 may extend the full length of the reflectors 12 and 14, if desired for certain applications. As shown in FIG. 1, the length of the opening 62 is limited by a pair of panels 73 and 75 secured to the end walls 24 and 26, respectively, by any suitable means, such as by screws. The dimensions, that is, the length and width of the opening 62 is determined by the characteristics of a lens system L (FIG. 3) used for projecting the reflected light from the object 48 in the object plane 44 to an image plane P.

While the lens system L is illustrated as a single lens, for the sake of simplicity and clarity, a plurality of lenses, as well as mirrors and prisms may also be used, if desired. Photosensitive material may be disposed in the image plane P. The photosensitive material may be moved synchronously with the sheet material 48 by any suitable means (not shown) known in the art.

The reflector 12 comprises a portion of the elliptical cylinder 20, that is disposed on one side of its major axis $cc'$. The reflector 14, on the other hand, comprises a portion of the elliptical cylinder 22, around the lamp 57, that is disposed on both sides of its major axis $aa'$. The rear edges 58 and 60 of the reflectors 12 and 14, respectively, are disposed to prevent any direct rays from the lamp 57 from escaping through the opening 62. Stray light outside of the housing 10 is also prevented, or markedly reduced, by the tubular member 64 which functions substantially as a light conduit for light from the material 48, between the planes 69 and 71, to the lens system L.

The operation of the optical illuminating system incorporated in the light reflector housing 10 will now be explained with the aid of FIG. 2. Light from the elongated lamp 57 illuminates sheet material 48 in the object plane 44 with both direct rays and indirect rays reflected from the reflectors 12 and 14. Since the concave walls 16 and 18 of the reflectors 12 and 14 respectively, are portions of the walls of hollow right elliptical cylinders, sharing a common pair of line foci F1 and F2, any light rays emitted from the light filament that impinge upon these concave walls 16 and 18 are refocused again at the line focus F2. Thus, for example, a direct ray 84, emitted from the filament at the line focus F1, impinges upon the concave wall 16 and is reflected, as a reflected ray 86, to the line focus F2. Similarly, a direct ray 88 from the filament along the line focus F1 impinging upon the concave surface 18 is reflected, as a reflected ray 90, to the line focus F2.

It is noted that no direct rays from the lamp 57 can pass through the opening 62, between the rear edges 58 and 60 of the reflectors 12 and 14, respectively. Because all reflected rays from the reflectors 12 and 14 are focused at the line focus F2, it is sometimes desirable to space the glass plate 46 slightly from the line focus F2 to prevent the glass from cracking due to the intense heat along the line focus F2.

Light from the illuminated sheet material 48 in the object plane 44, especially in the intense line of light along the line focus F2, can now be reflected through the opening 62 and through the tubular member 64 to an optical system (FIG. 3) for projection onto photosensitive material for reproductive purposes. By moving the sheet material 48, at a predetermined rate, perpendicularly to the line focus F2, consecutive, elongated portions of the sheet material 48 are illuminated successively so that they may be copied by the reflected images therefrom. The light reflected perpendicularly from the line focus F2 substantially bisects the opening 62 and the tubular member 64, as indicated by reflected ray 92. The reflected light may now be projected by the lens system L into the image plane P where suitable photosensitive material can be exposed.

From the foregoing description, it will be apparent that there has been provided an improved optical illuminating system, embodied in a novel, light reflector housing, employing elliptical reflectors of different ellipticity but sharing the same pair of parallel line foci. While only one embodiment of the invention has been shown and described, variations in the structure, all coming within the spirit of the invention, will, no doubt, readily suggest themselves to those skilled in the art. Hence, it is desired that the foregoing description shall be considered as illustrative and not in a limiting sense.

What is claimed is:

1. In apparatus of the type wherein an object is to be illuminated and an image thereof is to be projected through a lens system to an image plane, an optical illuminating system comprising, in combination,
   a pair of reflectors of different ellipticity, each of said reflectors comprising portions of the concave walls defining hollow right elliptical cylinders,
   said reflectors being disposed with their concave walls facing each other and sharing a single pair of line foci,
   means to dispose said object relatively much closer to one of said line foci than to the other of said line foci, and
   an elongated source of light disposed along said other of said line foci to illuminate said object,
   said reflectors having a pair of opposed edges spaced from each other and defining opposite edges of an opening through which light reflected from said object can pass for projection by said lens system to said image plane, said pair of opposed edges being disposed to prevent direct rays of light from said source of light from passing through said opening, whereby all said direct rays of light adjacent to said opening are reflected by said reflectors to said one of said line foci.

2. In apparatus of the type wherein an elongated portion of material in an object plane is to be illuminated and an image thereof is to be projected through a lens system to an image plane, an optical illuminating system comprising, in combination,
   a pair of reflectors of different ellipticity, each of said reflectors being portions of the concave walls of hollow right elliptical cylinders,
   said reflectors being disposed with their concave walls facing each other in a spaced-apart relationship and sharing a single pair of line foci,
   said object plane being disposed substantially at one of said line foci, and
   an elongated source of light disposed along said other of said line foci to illuminate said portion of material when in said object plane,
   said reflectors having rear edges spaced from each other and defining an opening through which direct light from said source of light is excluded and through which light from said elongated portion of material in said object plane can pass for projection by said lens system to said image plane.

3. A light reflector housing comprising
   a first reflector comprising a portion of the concave wall of a first hollow right elliptical cylinder, said first elliptical cylinder having a pair of spaced-apart line foci,
   a second reflector comprising a portion of the concave wall of a second hollow right elliptical cylinder, said second elliptical cylinder having a pair of line foci substantially coincident with that of said first elliptical cylinder and being of lesser ellipticity than said first elliptical cylinder,
   each of said first and said second reflectors having front and rear edges,
   means disposing said first and second reflectors with their concave walls facing each other,
   an object plane adjacent to said front edges and substantially including one of said line foci, whereby an object may be disposed for illumination, and
   means to dispose an elongated source of light along the other of said line foci to direct light to said object plane and to illuminate said object,
   said rear edges of said first and second reflectors being spaced from each other and disposed to define opposite edges of an opening through which only light reflected from said object can pass, whereby all direct rays from said source of light adjacent to said opening are reflected by said reflectors to said object.

4. A light reflector housing comprising
   a first reflector comprising a portion of the concave wall of a first hollow right elliptical cylinder, said first elliptical cylinder having a pair of spaced-apart line foci,
   a second reflector comprising a portion of the concave wall defining a second hollow right elliptical cylinder, said second elliptical cylinder having a pair of line foci substantially coincident with that of said first elliptical cylinder and being of lesser ellipticity than said first elliptical cylinder,
   each of said first and said second reflectors having front and rear parallel edges and opposite ends,
   a pair of opposite side walls fixed to said opposite ends of said first and second reflectors, respectively, said first and second reflectors being disposed with their concave walls facing each other,
   said front edges of said first and second reflectors being separated from each other and defining opposite edges of an opening, whereby an object adjacent to said opening and relatively closer to one of said line foci than to the other may be disposed,
   means to dispose an elongated source of light along said other of said line foci to illuminate said object,
   said rear edges of said first and second reflectors being spaced from each other and disposed to define opposite edges of an opening through which direct light from said source of light is excluded and through which only light reflected from said object can pass,
   a tubular member,
   means fixing said tubular member to at least one of said reflectors, said tubular member communicating with said opening and extending rearwardly therefrom, and
   means to air cool said housing comprising said first reflector being formed with at least one hole rearwardly of said light source,
   a transparent sheet of material mounted across said tubular member to block air therethrough, and
   at least a portion of said tubular member being spaced from said first reflector, whereby air may be blown into said housing for circulation therein, said air leaving said housing through said hole.

5. A light reflector housing comprising
   a first reflector comprising a portion of the concave wall defining a first hollow right elliptical cylinder,
   a second reflector, of different ellipticity from said first reflector, comprising a portion of the concave wall defining a second hollow right elliptical cylinder, each of said first and said second reflectors being disposed with their concave walls facing each other and sharing a common pair of parallel line foci,
   each of said first and said second reflectors having front and rear parallel edges and opposite ends, said edges being parallel to said pair of line foci, means attached to said ends fixing said first and said second reflectors with respect to each other, said front edges of said first and second reflectors being separated from each other and defining opposite edges of an opening therebetween, whereby an object, adjacent to said opening and being relatively much closer to one of said line foci than to the other may be disposed, and means to dispose an elongated source of light along said other of said line foci to illuminate said object, said rear edges of said first and second reflectors being spaced from each other and disposed to define opposite edges of an opening through which only light from said object plane can be reflected, whereby all direct rays from said source of light adjacent to the last-mentioned opening are reflected by said reflectors to said object.

6. A light reflector housing comprising a first reflector comprising a portion of the concave wall defining a first hollow right elliptical cylinder, a second reflector comprising a portion of the concave wall defining a second hollow right elliptical cylinder, said second cylinder having a pair of line foci substantially coincident with those of said first cylinder and being of lesser ellipticity than said first cylinder, each of said first and said second reflectors having front and rear parallel edges and opposite ends, said edges being parallel to said line foci, means attached to said ends fixing said first and said second reflectors with their concave walls facing each other and sharing the same pair of line foci in common, said front edges of said first and second reflectors being separated from each other and defining substantially an object plane therebetween, said object plane being disposed adjacent to one of said line foci, and an elongated source of light disposed adjacent to the other of said line foci to direct light towards said object plane, said rear edges of said first and second reflectors being spaced from each other and disposed to define opposite edges of an opening through which direct light from said source of light is excluded and through which only light from said object plane can be reflected, whereby rays from said light source impinge directly on said object plane and on said reflectors from which they are reflected towards said one of said light foci.

7. An optical illuminating system comprising first and second elliptical reflectors of different ellipticity but having concave walls defining portions of hollow right elliptical cylinders with similar spaced-apart parallel line foci, each of said first and said second reflectors having front and rear parallel edges, means fixing said first and second reflectors with their concave walls facing each other and their respective elliptical cylinders sharing a single pair of line foci in common, said front edges of said first and second reflectors being separated from each other and defining substantially an object plane therebetween for disposing an object to be illuminated, said object plane being relatively much closer to one of said line foci than to the other of said line foci, and means to dispose an elongated source of light along said other of said line foci to illuminate said object, said rear edges of said first and second reflectors being spaced from each other and disposed to define an imaginary plane upon which only light reflected from said object can impinge and from which direct light from said light source is excluded, whereby a maximum of light may be utilized to illuminate said object.

8. An optical illumination system comprising first and second reflectors of different ellipticity, each of said reflectors being portions of the concave walls defining hollow right elliptical cylinders, means fixing said reflectors with their concave walls facing each other and sharing a single pair of line foci, means to dispose an elongated source of light along one of said line foci, whereby to illuminate an object which may be disposed at substantially the other of said line foci, and said first and second reflectors having rear edges spaced from each other and disposed to define opposite limits of an opening through which only light reflected from said object can pass and from which direct light from said light source is excluded, whereby all direct rays from said source of light adjacent to said opening are reflected by said reflectors to said object.

References Cited by the Examiner

UNITED STATES PATENTS

| | | | |
|---|---|---|---|
| 1,763,630 | 6/1930 | Hopkins | 88—24 |
| 1,864,696 | 6/1932 | Steele et al. | 88—24 |
| 2,014,012 | 9/1935 | Wood | 240—41 |
| 2,819,649 | 1/1958 | McLeod et al. | 88—24 |

FOREIGN PATENTS

| | | |
|---|---|---|
| 36,590 | 9/1926 | Denmark. |
| 1,364,060 | 5/1964 | France. |
| 571,567 | 8/1945 | Great Britain. |

JOHN M. HORAN, *Primary Examiner.*

NORTON ANSHER, *Examiner.*

HAROLD H. FLANDERS, *Assistant Examiner.*